(No Model.) 2 Sheets—Sheet 2.
V. W. BLANCHARD.
VALVE GEAR.
No. 413,910. Patented Oct. 29, 1889.
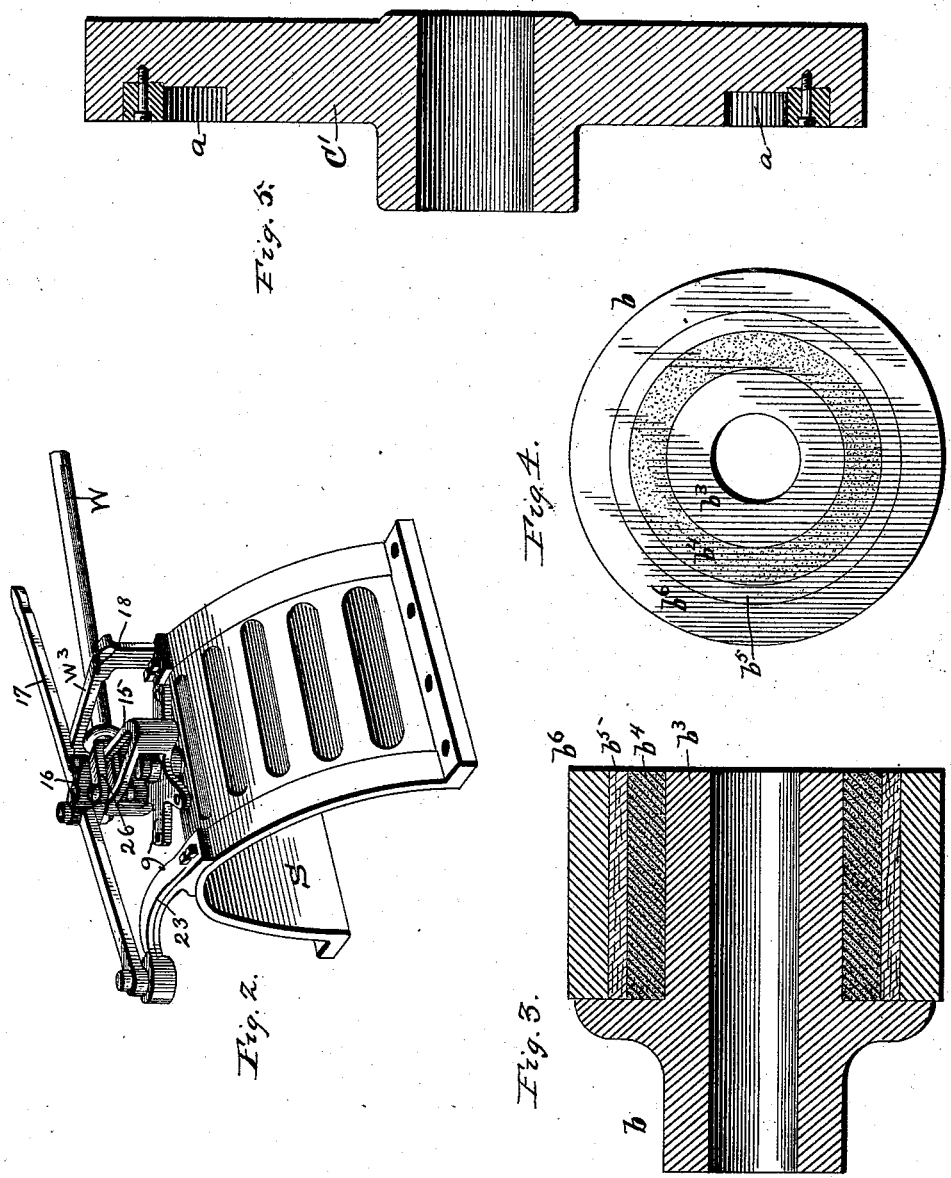
WITNESSES
P. L. Brooks
A. E. Drull
INVENTOR
Virgil W. Blanchard
by
T. S. Alexander
Attorney

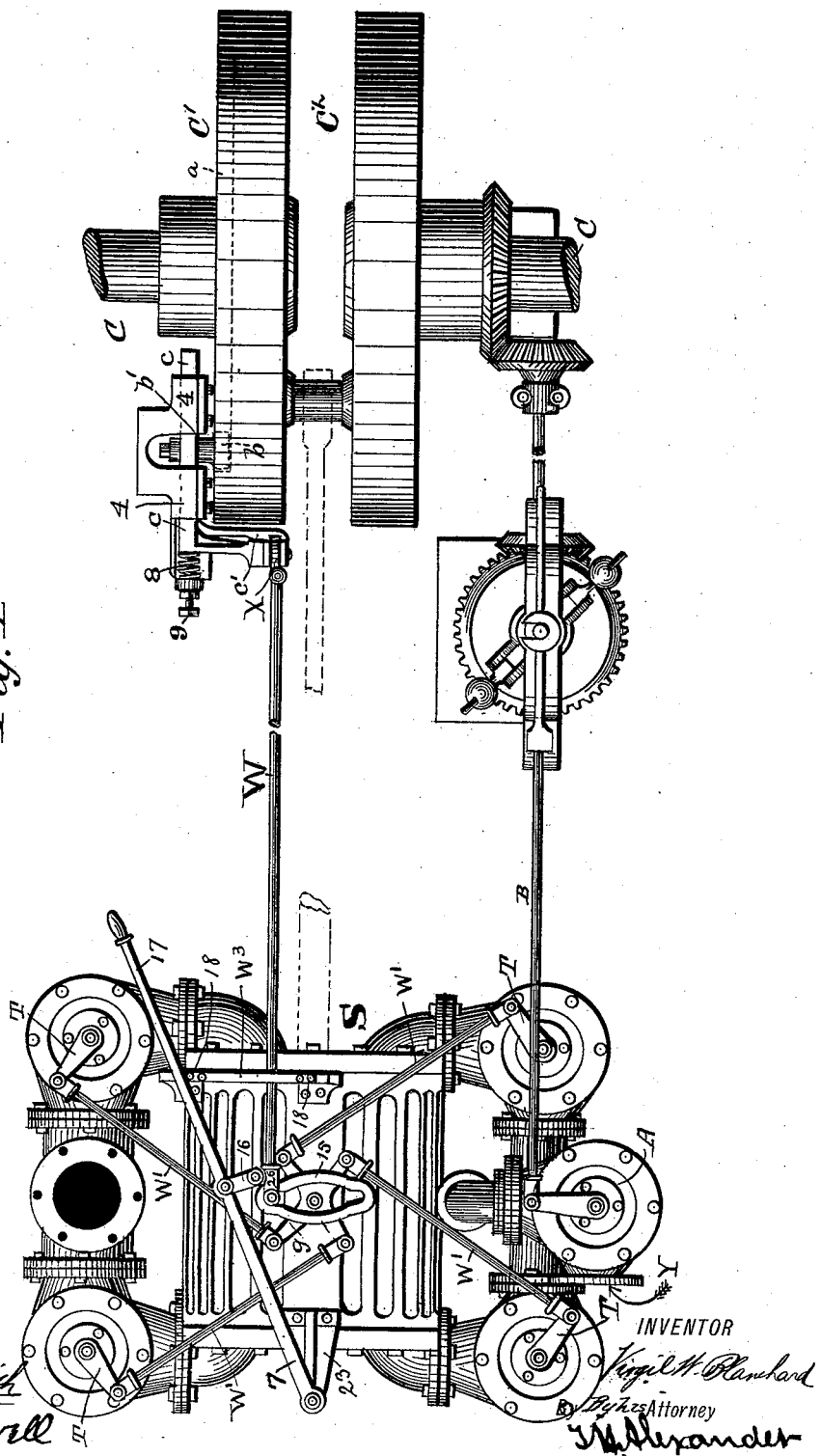

UNITED STATES PATENT OFFICE.

VIRGIL W. BLANCHARD, OF NEW YORK, N. Y., ASSIGNOR TO JOSEPH A. DAVIS, OF SAME PLACE.

VALVE-GEAR.

SPECIFICATION forming part of Letters Patent No. 413,910, dated October 29, 1889.

Application filed April 10, 1889. Serial No. 306,639. (No model.)

*To all whom it may concern:*

Be it known that I, VIRGIL W. BLANCHARD, of New York, in the county of New York and State of New York, have invented certain new and useful Improvements in Valve-Gear; and I do hereby declare that the following is a full, clear, and exact description thereof, reference being had to the accompanying drawings, and to the letters and figures of reference marked thereon, which form part of this specification, in which—

Figure 1 is a plan view of an engine, clearly illustrating the valve-gear and reversing devices. Fig. 2 is a perspective view in detail of the reversing mechanism. Fig. 3 is a sectional view through the cam-wheel. Fig. 4 is a face view of the same. Fig. 5 is a sectional view through the crank-wheel.

This invention is an improvement in steam-engines; and it has especial reference to the mechanism for actuating the inlet and exhaust valves of the cylinder-ports at the end of each stroke of the piston in the cylinder, and for reversing the motion of the engine, as will be clearly understood from the following description, taken in connection with the annexed drawings.

Referring to the drawings by letter, $C'$ $C^2$ designate crank-wheels keyed on shafts C C and connected by a wrist-pin, to which is suitably attached the connecting-rod, which is actuated by the piston of a steam-cylinder S, and indicated in dotted lines, Fig. 1. Wheel $C'$ is constructed with a deep cam-groove $a$ in its outer lateral surface near its periphery, in which runs an accurately-fitted elastic roller $b$ (indicated in dotted lines, Fig. 1) and journaled upon a wrist-pin $b'$, the latter being provided with an arm $c'$, which, through suitable connections X, communicates a reciprocating motion to a connecting-rod W, that is jointed to the slotted arm 15 of a centrally-pivoted spider $g$, having four radial limbs, from which motion is communicated to both port and exhaust valves, with which it is connected by means of rods $W'$ and crank-arms T on the ends of the valve-stems. This roller $b$ is constructed as clearly shown in Figs. 3 and 4, having a hub $b^3$, upon which is secured an annular bushing $b^4$ of flexible material—such as rubber—and outside this bushing is a layer of non-conducting material $b^5$, as asbestus, and outside of and over this layer of asbestus is shrunk an annular band of steel or hard metal $b^6$, which forms the periphery of the wheel $b$. The latter is thus cushioned and insures a smooth movement to the wrist-pin and the slide to which said pin is connected.

The roller $b$ is described and claimed in my application for crank-wheel filed April 10, 1889, Serial No. 306,640, and is not herein claimed.

4 4 designates ways or guides for the sliding bar $c$, that carries roller $b$ on its wrist-pin $b'$.

8 designates a stiff coiled spring applied to the sliding bar $c$, by means of which the roller $b$ may be continually forced against the shortest bearing-surface of the cam-groove in crank-wheel $C'$, thereby lessening the motion of said roller and preventing grinding of the surface thereof between the sides of the cam-groove.

9 indicates a set-screw, by means of which spring 8 may be compressed or relaxed in its action against bar $c$.

By means of the elastic construction of roller $b$, running in the cam-groove, no shock or undue vibration is realized in the slight action required on its part to actuate in their opening and closing movements the steam-valves with which it is connected, as above described.

The reversing mechanism is an essential element when the engine is applied to railroad locomotion or marine purposes. This I will now describe.

15 indicates a plate provided with a slot and connected in the manner shown or otherwise to the spider $g$, mounted on cylinder S.

16 is a short link connected by one extremity to the end of connecting-rod W, and by its other end to an adjustable reversing-lever 17, which is pivoted at one end upon a bracket 23, rising from cylinder S. The other end of the lever is supported on a guide-bracket $W^3$ and moves between shoulders 18 18 thereon. The end of rod W is connected loosely by a loop 26 with the plate 15, so that the end of the rod W may be shifted to either end of plate 15 in the slot thereof and oscillate said bar 15 and the attached spider when it is reciprocated.

From the construction shown it is evident that by actuating the reversing-lever 17 between the shoulders or notches 18 of support W³ the extremity of the connecting-rod W may be thrown in either direction past the center of the centrally-pivoted spider g below, thereby causing the motion of the roller b to operate the steam-valves to which the spider is connected in opposite directions, thus reversing the time of opening and closing the inlet and exhaust valves and the motion of the engine.

Steam is supplied to the cylinder S first through a valve A at the point indicated by the arrow Y, which valve is actuated and controlled by the governor shown in the drawings, but not herein claimed, through the medium of suitable connecting devices, so that the valve A controls the quantity of steam permitted to enter the inlet-valves of the engine.

Having described my invention, what I claim as new is—

1. The combination of the engine-cylinder, its inlet and exhaust valves, and the spider for actuating the same, with the slotted plate above and rigidly secured to said spider, the connecting-rod adjustably attached to said plate, and the reversing-lever for shifting said connecting-rod, substantially as and for the purpose specified.

2. The combination of the spider g, connected to the inlet and exhaust valves of a steam-engine cylinder, with the slotted plate 15, connected to said spider, the connecting-rod W, loosely engaging plate 15, and the devices for shifting rod W, all constructed and arranged substantially as and for the purpose specified.

3. The combination of the engine-cylinder, its inlet and exhaust valves, and the spider g, pivoted on said cylinder and connected to the stems of the valves by rods W', with the slotted plate 15, rod W, connected thereto, the lever 17, and the link-connection between said lever and rod W, all as and for the purpose described.

4. The combination, in a steam-engine, of the cylinder, its inlet and exhaust ports, and the cam-grooved wheel on the main shaft, the roller playing in said groove, the slide actuated thereby, and the connecting-rod attached to said slide, with the spider mounted on the cylinder, and link-connections between the arms thereof and the valves, and the slotted plate supported by said spider, and the adjustable link-connection between the same and the connecting-rod, substantially as and for the purpose described.

5. The combination of the cam-grooved wheel C', the slide c, its wrist-pin and roller b, and the connecting-rod W, with the steam-engine cylinder, its inlet and exhaust port valves, the spider mounted thereon and connected to said valves, the plate 15, secured to said spider and connected to rod W, the reversing-lever 17, the link 16, and shouldered bracket W³, all substantially as and for the purpose described.

In testimony that I claim the foregoing as my own I affix my signature in presence of two witnesses.

VIRGIL W. BLANCHARD.

Witnesses:
  W. R. KEYWORTH,
  F. O. McCLEARY.